Reissued Mar. 9, 1943

Re. 22,286

UNITED STATES PATENT OFFICE 22,286

AZO DYES

Swanie S. Rossander, Wilmington, Del., Donovan E. Kvalnes, Penns Grove, N. J., and Chiles E. Sparks, Wilmington, Del., assignors to E. I. du Pont de Nemours & Company, Wilmington, Del., a corporation of Delaware No Drawing. Original No. 2,249,045, dated July 15, 1941, Serial No. 294,430, September 12, 1939. Application for reissue July 7, 1942, Serial No. 450,000

17 Claims. (Cl. 260—145)

This invention relates to azo dyes, to direct dyes, to dyes after-treated with formaldehyde, and to metallized dyes.

Direct azo dyes are those which dye the cloth directly from a water bath without subsequent treatment to bring out the color. Many examples of such direct dyes are recorded in the literature of the trade. These direct colors are generally substantive to cotton and other forms of cellulose and regenerated cellulose, giving bright shades, but having only moderate fastness to light. These direct colors show considerable loss in strength and impart an undesirable stain to associated uncolored or differently colored fibers when they are washed. Direct colors with good washing fastness, and which will not stain associated fibers are desired by the trade, because of their low cost and ease of application. In order to provide dyes which do not have poor fastness to washing the art has been forced to use the developed colors, wherein an intermediate, usually a direct dye, is azotized on the fiber and developed with suitable coupling compounds. These, so-called developed or diazo colors are generally faster to washing than the corresponding direct colors, but they are duller, more costly, more costly to apply as such dyeings require much time and labor and the dyeings change shade during development.

It is an object of this invention to provide a class of colors having the simplicity of application and constant, bright shade of the direct colors, and washing fastness superior to the direct colors. Another object of the invention is to provide methods of applying the colors and of increasing their light fastness.

The objects of the invention are attained in general by applying to the material to be dyed, compounds represented by the formula $$A \leftarrow Y \leftarrow X \rightarrow Y \rightarrow A$$

and after-treating the dyed fabric with formaldehyde, formaldehyde and a salt of a soluble metal or with a soluble metal salt.

In general the direct colors are provided by tetrazotizing one mol equivalent of a suitable compound represented by the symbol X and coupling with two mol equivalents of a suitable compound Y to make a compound of the general type $$NH_2—Y \leftarrow X \rightarrow Y—NH_2$$

This compound is then tetrazotized and coupled with two mol equivalents of a compound A. The resulting compound $$A \leftarrow Y \leftarrow X \rightarrow Y \rightarrow A$$

when separated from the medium by suitable means is soluble in water. Such solutions may be used as dyebaths in which dyeable materials may be immersed and dyed. Further objects of the invention are attained by treating such dyeings with a solution of formaldehyde, with solutions of certain soluble salts of metals or with both of said solutions, whereby new and improved dyeings are obtained.

In the formula $$A \leftarrow Y \leftarrow X \rightarrow Y \rightarrow A$$

the symbol A is a meta-dihydroxy benzene represented by the formula

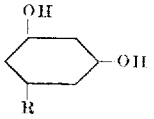

in which R is one of a group consisting of hydrogen, alkyl, alkoxy, hydroxy, amino, halogen, CN, carboxyl and sulfonic acid. Alkyl refers to alkyl radicals having 1 to 6 carbons and alkoxy refers to the corresponding alkoxy groups.

The symbol X stands for a diphenyl compound having amino groups in the benzene nuclei which are ortho, meta or para to a bridging group. These compounds are represented by the general formulae

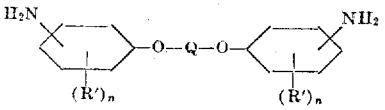

and

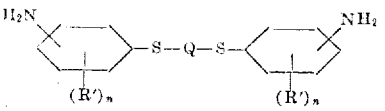

in which Q is a straight or branched chain alkylene radical having 1 to 10 carbons, a mono-hydroxy-alkylene radical having 3 to 7 carbons wherein the hydroxyl group is attached to a carbon atom other than one which is directly attached to S or O, or two alkylene radicals containing 1 to 4 carbons connected together by an oxygen bridge as in an ether; R′ is hydrogen, alkyl, alkoxy, halogen, carboxy or sulfonic acid; and the *n*'s are integers of 1 to 4. The R′ groups in a given diphenyl compound may be alike or unlike.

The symbol Y stands for primary arylamines of the benzene and naphthalene series as follows.

(*a*) Amino-phenyl pyrazolones which are represented by the formula

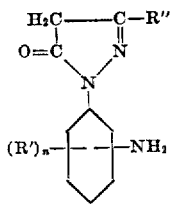

wherein R″ is methyl or carboxyl, R′ represents one or any combination of the same groups as R′ in the X compounds, *n* is 1 to 4 and amino may be in any position of the benzene ring.

(*b*) Amino benzenes which are represented by the formula

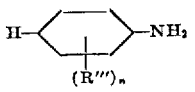

wherein R‴ is one or any combination of the group consisting of hydrogen, alkyl and alkoxy, *n* is 1 to 4, and R‴ groups may be substituted in any position of the benzene ring except that occupied by —H;

(*c*) Naphthylamines represented by the formula

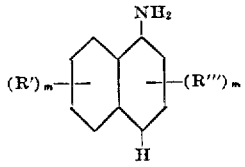

wherein *m* is 1 or 2, and the R groups may be substituted in any positions of the several rings except that occupied by —H; and (*d*) 1- and 2-amino-naphthol sulfonic acids represented by the formula

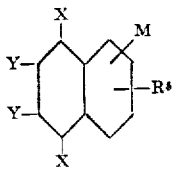

wherein one X is hydroxy and the other is hydrogen, the Y which is meta to hydroxy is sulfonic acid and the other is hydrogen, $R^5$ is one of a group consisting of hydrogen, alkyl, alkoxy and sulfonic acid, and M is one of a group consisting of

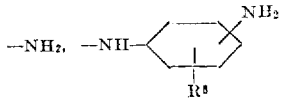

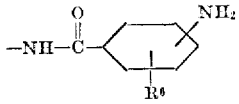

and

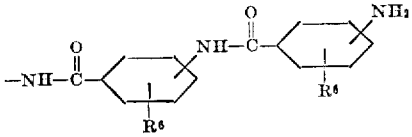

wherein amino is in the meta or para position of the benzene nucleus and $R^6$ is one of a group consisting of hydrogen, alkyl, alkoxy, halogen and sulfonic acid.

In the X and Y components alkyl and alkoxy groups contain 1 to 6 carbons. Any of the halogens may be present where they are indicated.

The invention will be more fully set forth in the following more detailed description which includes examples that are given as illustrative embodiments of the invention and not as limitations thereof. Parts are expressed in parts by weight.

Example 1

A slurry was made by mixing 122 parts of 1,2-di(4′-amino-phenoxy) ethane with 5000 parts of water and adding 91 parts of 100% hydrochloric acid as a 30% solution. The mixture was iced to 0° C. and 69 parts of 100% sodium nitrite were added as a 30% solution. Tetrazotization was carried out at 0–5° C. for one-half hour with a faint excess nitrite.

A slurry was made by mixing 360 parts of 2-(3′-amino benzoyl amino)-5-naphthol-7-sulfonic acid and 17 parts of 100% ammonia as a water solution or sufficient ammonia to make a complete solution which was alkaline to Brilliant yellow. Then 15 parts of sodium bicarbonate were added and the solution was iced to 0° C. Finally 265 parts of sodium carbonate were added.

The tetrazo was slowly added to the alkaline solution of the coupling component whilst maintaining a temperature of 0–5° C. and an excess of 2-(3′-amino benzoyl amino)-5-naphthol-7-sulfonic acid. The suspension was maintained distinctly alkaline to Brilliant yellow paper, stirred for one hour after the addition of the tetrazo, then heated to 70–80° C. and finally salted (5%) with sodium chloride and filtered.

The filter cake was stirred into 4,000 parts of water until a smooth slurry was obtained, iced to 10° C. and 155 parts of 100% hydrochloric acid as a 30% solution were added. A solution containing 69 parts of 100% sodium nitrite as a 30% solution was added. Tetrazotization was completed at 10°–12° C. in about one hour with a distinct excess of nitrite.

A solution was made by stirring 132 parts of 1,3-dihydroxy benzene into 2,500 parts of water. The solution was iced to 0° C. and 220 parts of sodium carbonate were added.

The tetrazo was slowly added to the alkaline solution of 1,3-dihydroxy benzene. There was an excess of 1,3-dihydroxy benzene and the suspension was alkaline to Brilliant yellow. The suspension was stirred one hour after the addition of the tetrazo, heated to 70°–80° C., salted slowly with 10% of sodium chloride and filtered. The precipitate was dried at 80°–85° C. in an oven and was a powder having a brownish-red appearance.

The compound is represented by the formula

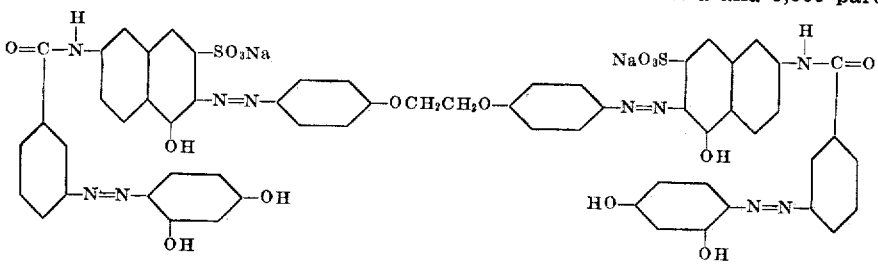

Rayon was dyed and after-treated as follows.

A solution was made by dissolving 0.2 gram of the product in 50 cc. of water at 190°–200° F. and adding 0.4 gram of sodium carbonate to assist the solution. The solution was diluted with stirring to a total volume of 500 cc. with water at approximately 160° F. and 40 cc. of a 10% solution of Glauber's salt were added. 10 gram piece of rayon was wet out with water, squeezed partially dry and entered into the dye bath. The temperature of the dye bath was raised to 180°–190° F. in the course of fifteen minutes and held at this temperature for one hour whilst stirring the dyeing at frequent intervals. At the end of one hour the dyeing was removed and rinsed in cold water.

*After-treatment in a fresh bath*

The rinsed dyeing from the above operation was entered into 500 cc. of water at 130°–140° F. Then approximately 10 cc. of a 10% formaldehyde solution (25 cc. of approximately 37% formaldehyde by weight diluted to 250 cc. with water) were added. The bath was held at this temperature for twenty minutes and the dyeing was removed, rinsed and dried.

*After-treatment in the dye bath*

An alternative after-treating process which is the preferred procedure because of its economy and ease of application was carried out as follows.

At the end of the dyeing period 10 cc. of 10% formaldehyde solution was added to the dye bath at bath temperature. After twenty minutes the dyeings were removed, rinsed and dried.

A dyeing with a bright yellow scarlet shade was obtained which showed good discharge properties and better fastness to washing than the direct dyeing.

ture was iced to 0° C. and 69 parts of 100% sodium nitrite were added as a 30% solution. Tetrazotization was carried out at 0–5° C. for one-half hour with a faint excess nitrite.

A slurry was made by mixing 360 parts of 2-(4'-amino benzoyl amino)-5-naphthol-7-sulfonic acid and 5,000 parts of water. The compound was dissolved by adding 17 parts of 100% ammonia as a water solution or sufficient ammonia to make a complete solution which was alkaline to Brilliant yellow. Then 15 parts of sodium bicarbonate were added and the solution was iced to 0° C. Finally 265 parts of sodium carbonate were added.

The tetrazo was slowly added to the alkaline solution of the coupling component whilst maintaining a temperature of 0°–5° C. and an excess of 2-(4'-amino benzoyl amino)-5-naphthol-7-sulfonic acid. The suspension was maintained distinctly alkaline to Brilliant yellow paper, stirred for one hour after the addition of the tetrazo then heated to 70°–80° C. and finally salted (5%) with sodium chloride and filtered.

The filter cake was stirred into 4,000 parts of water until a smooth slurry was obtained, iced to 10° C. and 115 parts of 100% hydrochloric acid were added as a 30% solution. A solution containing 69 parts of 100% sodium nitrite as a 30% solution was added. Tetrazotization was completed at 10°–15° C. in about one hour with a distinct excess of nitrite.

A solution was made by stirring 132 parts of 1,3-dihydroxy benzene into 2,500 parts of water. The solution was iced to 0° C. and 220 parts of sodium carbonate were added.

The tetrazo was slowly added to the alkaline solution of 1,3-dihydroxy benzene. There was an excess of 1,3-dihydroxy benzene and the suspension was maintained alkaline to Brilliant yellow. The suspension was stirred one hour after the addition of the tetrazo, heated to 70°–80° C., salted slowly (10%) with sodium chloride and filtered. The filter cake was dried at 80°–85° C. in an oven giving a dry powder having a brownish red appearance.

The compound is represented by the formula

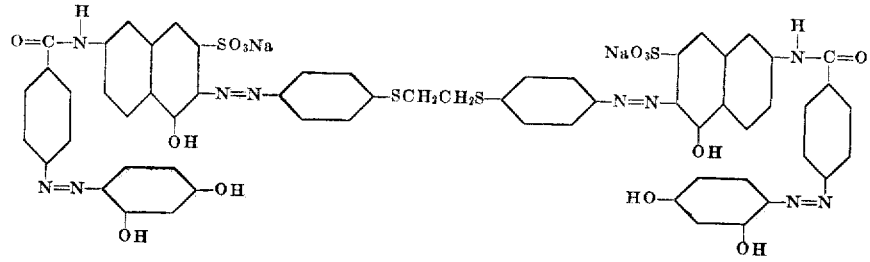

EXAMPLE 2

A slurry was made by mixing 138 parts of 1,2-di(4'-amino phenyl thio) ethane with 5000 parts of water and then adding 91 parts of 100% hydrochloric acid as a 30% solution. The mix- A dyeing was made and after-treated in a manner similar to that described in Example 1. The dyeing was a bright red shade having excellent fastness to washing and good discharge properties. The fastness to washing was better than the direct dyeing.

Example 3

A mixture containing 122 parts of 1,2-di(4'-amino-phenoxy) ethane, 5,000 parts of water and 91 parts of 100% hydrochloric acid as a 30% solution was iced to 0° C. and 69 parts of 100% sodium nitrite as a 30% solution were added. The amino compound was tetrazotized at 0–5° C. for one-half hour with a faint excess of nitrite present.

To a slurry containing 230 parts of 1-(3'-amino-phenyl)-5-pyrazolone-3-carboxylic acid and 5,000 parts of water, 106 parts of sodium carbonate were added and the mixture was stirred until complete solution was obtained which was alkaline to Brilliant yellow paper. Then 265 parts of sodium carbonate were added and the solution was iced to 0° C.

The tetrazo was slowly added to the cold alkaline solution of the coupling component whilst maintaining the temperature at 0–5° C. There was an excess of 1-(3'-amino phenyl)-5-pyrazolone-3-carboxylic acid and the suspension was alkaline to Brilliant yellow. After the addition of the tetrazo the suspension was stirred one hour, heated to 70°–80° C., salted (10%) with sodium chloride, filtered and the filter cake was dried in an oven. The dry powder was red orange in appearance. The coupling component was 1,3-dihydroxy benzene and was used in the form described in the preceding examples.

The compound is represented by the formula

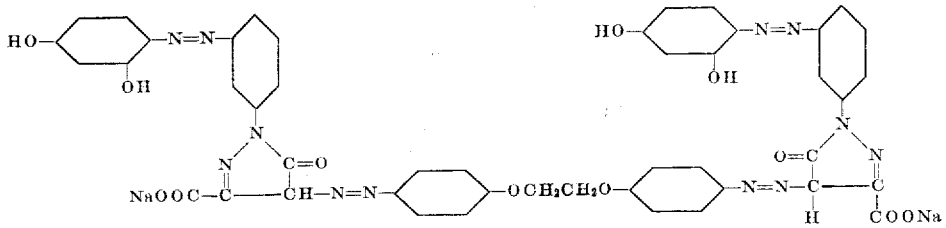

A dyeing was made and after-treated in a manner similar to that described in Example 1. A bright dyeing having a bright orange shade and showing excellent fastness to washing was obtained.

Example 4

A slurry was made by stirring 122 parts of 1,2-di(4'-aminophenoxy) ethane into 5,000 parts of water and 91 parts of 100% hydrochloric acid as a 30% solution were then added. The mixture was iced to 0° C. and 69 parts of 100% sodium nitrite as a 30% solution were added. Tetrazotization was carried out at 0°–5° C. for one-half hour with a faint excess of nitrite.

A slurry containing 410 parts of 2-(4'-amino-3'-sulfo-phenylamino)-5-naphthol-7-sulfonic acid and 5000 parts of water was made and then 250 parts of sodium carbonate were added to make complete solution. The solution was iced to 0° C. 265 parts of sodium carbonate were added. The tetrazo was slowly added to the alkaline solution of the coupling component whilst maintaining a temperature of 0°–5° C., an excess of 2-(4'-amino-3'-sulfo-phenylamino)-5-naphthol-7-sulfonic acid, and a distinct alkalinity to Brilliant yellow. The mixture was stirred one hour after the addition of the tetrazo, heated to 70°–80° C., salted (15%) with sodium chloride and filtered.

The filter cake was stirred with 4,000 parts of water until a smooth slurry was obtained, iced to 10° C. and then 140 parts of 100% hydrochloric acid as a 30% solution were added. A 10% solution containing 69 parts of 100% sodium nitrite was added and tetrazotization was carried out at 10°–15° C. for one hour with a distinct excess of nitrite.

A solution containing 132 parts of 1,3-dihydroxy benzene in 3,000 parts of water was made, iced to 0° C. and then 300 parts of sodium carbonate were added.

The tetrazo was slowly added to the alkaline solution of 1,3-dihydroxy benzene having present an excess of 1,3-dihydroxy benzene and having the suspension alkaline to Brilliant yellow. The mixture was stirred one hour after the addition of the tetrazo, heated to 70°–80° C., salted (15%) with sodium chloride and filtered. The filter cake was dried at 80°–85° C. in an oven. The dry powder was blue black in appearance.

The compound is represented by the formula

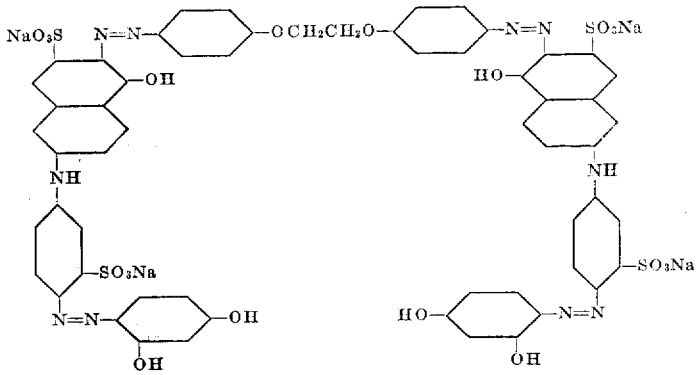

A dyeing was made and after-treated in a manner similar to that described in Example 1. A bright dyeing in a bright rubine shade was obtained which showed excellent fastness to washing.

Example 5

The procedure of Example 4 was followed, substituting 129 parts of 1,3-di-(4'-aminophenoxy)-propane for 122 parts of 1,2-di-(4'-aminophenoxy)-ethane and 371 parts of 2-(3'- amino - benzoylamino) -5-naphthol - 7 - sulfonic acid for 410 parts of 2-(4'-amino-3'-sulfo-phenylamino) -5-naphthol-7-sulfonic acid.

The final product is represented by the formula

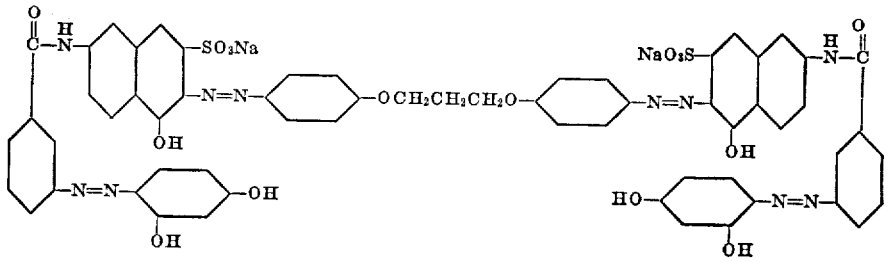

A dyeing was made and after-treated in a manner similar to that described in Example 1.

This dyeing was a bright scarlet shade which showed excellent fastness to washing.

EXAMPLE 6

The procedure of Example 4 was followed, substituting 150 parts of 1,6-di-(4'-amino-phenoxy)-hexane for 122 parts of 1,2-di-(4'-aminophenoxy) -ethane and 371 parts of 2-(3'-aminobenzoylamino) -5-naphthol - 7 - sulfonic acid for 410 parts of 2-(4'-amino-3'-sulfo-phenylamino) - 5-naphthol-7-sulfonic acid.

The final product is represented by the following formula

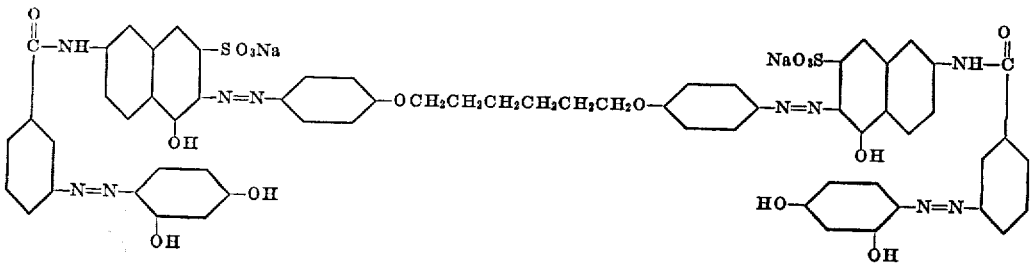

A dyeing was made and after-treated in a manner similar to that described in Example 1. This dyeing was a scarlet shade which showed excellent fastness to washing.

EXAMPLE 7

The procedure of Example 4 was followed, substituting 137 parts of 1,3-di-(4'-aminophenoxy) - propanol-2 for 122 parts of 1,2-di-(4'-aminophenoxy) -ethane and 371 parts of 2-(4'-amino-benzoylamino) -5-naphthol-7-sulfonic acid in place of 410 parts of 2-(4'-amino-3'-sulfo-phenylamino) -5-naphthol-7-sulfonic acid.

The final product is represented by the formula

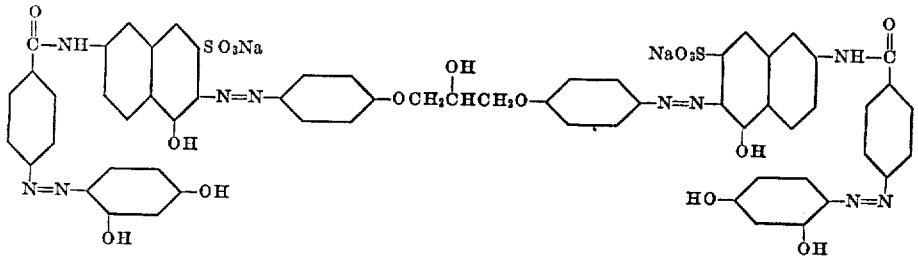

A dyeing was made and after-treated in a manner similar to that described in Example 1. This dyeing was a scarlet shade which showed excellent washing fastness.

It is to be understood that the invention is not limited to the specific procedures described in the above examples since modifications, well known to the art, can be applied with satisfactory results. Many other similar products can be prepared by such methods and suitable modifications thereof.

Other illustrations of the invention are shown in the following table. The products listed in the table are prepared by methods similar to those set forth in the foregoing examples. The double arrows in the table indicated that two mols of the compounds toward which the arrows point were coupled with the tetrazotized compound from which the arrows proceed. Dyeings with these compounds were bright and they had the new improved properties of the compounds described in the examples.

| Example | Combination | Shade |
|---|---|---|
| 8 | 1,2-di(4′-aminophenoxy) ethane ⟹ (2-amino-5-naphthol-7-sulfonic acid)$_2$ ⟹ (1,3-di-hydroxy benzene)$_2$ | Maroon. |
| 9 | 1,2-di(4′-aminophenoxy) ethane ⟹ [2-(4′-amino-benzoyl amino)-5-naphthol-7-sulfonic acid]$_2$ ⟹ (1,3-dihydroxy benzene)$_2$. | Scarlet. |
| 10 | 1,2-di(4′-aminophenylthio) ethane ⟹ [2-(3′-amino-benzoyl amino)-5-naphthol-7-sulfonic acid]$_2$ ⟹ (1-3,dihydroxy benzene)$_2$. | Red. |
| 11 | 1,2-di(3′-aminophenoxy) ethane ⟹ [2-(4′-amino-benzoyl-amino)-5-naphthol-7-sulfonic acid]$_2$ ⟹ (1,3-dihydroxy-benzene)$_2$. | Orange. |
| 12 | 1,2-di(4′-aminophenylthio) ethane ⟹ (2-amino-5-naphthol-7-sulfonic acid)$_2$ ⟹ (1,3-dihydroxy-benzene)$_2$ | Rubine. |
| 13 | 1,2-di(4′-aminophenylthio) ethane ⟹ (1-amino-naphthalene-6-sulfonic acid)$_2$ ⟹ (1,3-dihydroxy benzene)$_2$ | Maroon. |
| 14 | 1,2-di(4′-aminophenylthio) ethane ⟹ [2-(4′-amino-3′-sulfo phenyl amino)-8-naphthol-6-sulfonic acid]$_2$ ⟹ (1,3-dihydroxy benzene)$_2$ | Brown. |
| 15 | 1,2-di(4′-aminophenylthio) ethane ⟹ (1-(3′-amino-phenyl)-5-pyrazolone-3-carboxylic acid)$_2$ ⟹ (1,3-dihydroxy-benzene)$_2$. | Orange. |
| 16 | 1,2-di-(4′-amino-phenoxy)-ethane ⟹ (1-amino-5-naphthol-7-sulfonic-acid)$_2$ ⟹ (1,3-dihydroxy-benzene)$_2$ | Maroon. |
| 17 | 1,3-di-(4′-amino-phenyl-thio)-propane ⟹ [2-(4′-amino-benzoylamino)-5-naphthol-7-sulfonic acid]$_2$ ⟹ (1,3-dihydroxy-benzene)$_2$. | Red. |
| 18 | 1,2-di-(4′-amino-2′-sulfo-phenoxy)-ethane ⟹ [1-(3′-amino-phenyl)-5-pyrazolone-3-carboxylic-acid]$_2$ ⟹ (1,3-dihydroxy-benzene)$_2$. | Orange. |
| 19 | 1,2-di-(4′-amino-2′-sulfo-phenoxy)-ethane ⟹ (2-methoxy-5-methyl-aniline)$_2$ ⟹ (1,3-dihydroxy-benzene)$_2$ | Brown. |
| 20 | 1,2-di-(4′-amino-2′-sulfo-phenoxy)-ethane ⟹ (1-amino-naphthalene)$_2$ ⟹ (1,3-dihydroxy-benzene)$_2$ | Do. |
| 21 | 1,3-di-(4′-amino-phenoxy)-propane ⟹ [2-(4′-amino-benzoyl-amino)-5-naphthol-7-sulfonic-acid]$_2$ ⟹ (1,3-dihydroxy-benzene)$_2$ | Scarlet. |
| 22 | 1,3-di-(4′-amino-phenoxy)-2-propanol ⟹ (2-amino-5-naphthol-7-sulfonic-acid)$_2$ ⟹ (1,3-dihydroxy-benzene)$_2$ | Maroon. |
| 23 | 1,3-di-(4′-amino-phenoxy)-2-propanol ⟹ [1-(3′-amino-phenyl)-5-pyrazolone-3-carboxylic-acid]$_2$ ⟹ (1,3-dihydroxy-benzene)$_2$. | Orange |
| 24 | 1,2-di-(4′-amino-phenyl-thio)-ethane ⟹ [2-amino-8-naphthol-6-sulfonic-acid]$_2$ ⟹ (1,3-dihydroxy-benzene)$_2$ | Brown |
| 25 | 1,2-di-(4′amino-phenoxy)-ethane ⟹ [2-(4′-amino-benzoyl-amino)-5-naphthol-7-sulfonic-acid]$_2$ ⟹ (1,3-dihydroxy-benzene-5-sulfonic-acid)$_2$. | Scarlet. |
| 26 | 1,3-di-(4′-amino-phenoxy)-propane ⟹ [1-(3′-amino-phenyl)-5-pyrazolone-3-carboxylic-acid]$_2$ ⟹ (1,3-dihydroxy-benzene)$_2$ | Orange. |
| 27 | 1,3-di-(4′-amino-phenoxy)-propane ⟹ (2-amino-5-naphthol-7-sulfonic acid)$_2$ ⟹ (1,3-dihydroxy-benzene)$_2$ | Maroon. |
| 28 | 1,2-di-(4′-amino-2′-chloro-phenoxy)-ethane ⟹ [1-(3′-amino-phenyl)-5-pyrazolone-3-carboxylic-acid]$_2$ ⟹ (1,3-dihydroxy-benzene)$_2$. | Orange. |
| 29 | 1,2-di-(2′-methyl-5′-amino-phenoxy)-ethane ⟹ (2-amino-5-naphthol-7-sulfonic-acid)$_2$ ⟹ (1,3-dihydroxy-benzene)$_2$. | Maroon. |
| 30 | 1,2-di-(2′-methyl-5′-amino-phenoxy)-ethane ⟹ [1-(3′amino-phenyl)-5-pyrazolone-3-carboxylic acid]$_2$ ⟹ (1,3-dihydroxy-benzene)$_2$. | Orange. |
| 31 | 1,2-di-(2′-methyl-5′-amino-phenoxy)-ethane ⟹ [2-(4′-amino-benzoyl-amino)-5-naphthol-7-sulfonic-acid]$_2$ ⟹ (1,3-dihydroxy-benzene)$_2$. | Scarlet. |
| 32 | 1,2-di-(2′-methoxy-4′-amino-phenoxy)-ethane ⟹ [2-(4′-amino-benzoyl-amino)-5-naphthol-7-sulfonic-acid]$_2$ ⟹ (1,3-dihydroxy-benzene)$_2$. | Do. |
| 33 | 1,2-di-(2′-methoxy-4′-amino-phenoxy)-ethane ⟹ [1-(3′-amino-phenyl)-5-pyrazolone-3-carboxylic-acid]$_2$ ⟹ (1,3-dihydroxy-benzene)$_2$. | Orange. |
| 34 | 1,2-di-(2′-methoxy-4′-amino-phenoxy)-ethane ⟹ (2-amino-5-naphthol-7-sulfonic-acid)$_2$ ⟹ (1,3-dihydroxy-benzene)$_2$. | Maroon. |
| 35 | 1,2-di-(2′-chloro-4′-amino-phenoxy)-ethane ⟹ [2-(4′-amino-benzoyl-amino)-5-naphthol-7-sulfonic-acid]$_2$ ⟹ (1,3-dihydroxy-benzene)$_2$. | Scarlet. |
| 36 | 1,2-di-(4′-amino-phenoxy)-ethane ⟹ [2-(4′-amino-benzoyl-amino)-5-naphthol-7-sulfonic-acid]$_2$ ⟹ (1,3,5-trihydroxy-benzene)$_2$. | Do. |
| 37 | 1,3-di-(4′-amino-phenoxy)-2-propanol ⟹ [2-(4′-amino-3′-sulfo-phenyl-amino)-5-naphthol-7-sulfonic-acid]$_2$ ⟹ (1,3-dihydroxy-benzene)$_2$. | Rubine. |
| 38 | 1,3-di-(4′-amino-phenoxy)-2-propanol ⟹ [2-(4′-amino-3′-sulfo-phenyl-amino)-8-naphthol-6-sulfonic acid]$_2$ ⟹ (1,3-dihydroxy-benzene)$_2$. | Brown. |
| 39 | 1,3-di (4′-amino-phenoxy)-propane ⟹ [2-(4′-amino-3′-sulfo-phenyl-amino)-5-naphthol-7-sulfonic-acid]$_2$ ⟹ (1,3-dihydroxy-benzene)$_2$. | Rubine. |
| 40 | 1,2-di-(2′-methoxy-4′-amino-phenoxy)-ethane ⟹ [2-(4′-amino-3′-sulfo-phenyl-amino)-5-naphthol-7-sulfonic acid]$_2$ ⟹ (1,3-dihydroxy-benzene)$_2$. | Violet. |
| 41 | 1,2-di-(4′-amino-phenoxy)-ethane ⟹ [2-(4′-amino-3′-sulfo-phenyl-amino)-8-naphthol-6-sulfonic-acid]$_2$ ⟹ (1,3-dihydroxy-benzene)$_2$. | Brown. |
| 42 | 1,3-di-(4′-amino-phenoxy)-propane ⟹ [2-(4′-amino-3′-sulfo-phenyl-amino)-8-naphthol-6-sulfonic-acid]$_2$ ⟹ (1,3-dihydroxy-benzene)$_2$. | Do. |
| 43 | 1,2-di-(2′-methyl-5′-amino-phenoxy)-ethane ⟹ [2-(4′-amino-3′-sulfo-phenyl-amino)-8-naphthol-6-sulfonic-acid]$_2$ ⟹ (1,3-dihydroxy-benzene)$_2$. | Do. |
| 44 | 1,2-di-(2′-methoxy-4′-amino-phenoxy)-ethane ⟹ [2-(4′-amino-3′-sulfo-phenyl-amino)-8-naphthol-6-sulfonic-acid]$_2$ ⟹ (1,3-dihydroxy-benzene)$_2$. | Do. |
| 45 | 1,2-di-(4′-amino-phenoxy)-ethane ⟹ [2-(4′-amino-benzoyl-amino)-5-naphthol-7-sulfonic acid]$_2$ ⟹ (1,3-dihydroxy-5-methyl-benzene)$_2$. | Scarlet. |
| 46 | 1,4-di-(4′-aminophenoxy)-butane ⟹ [2-(4′-aminobenzoyl-amino)-5-naphthol-7-sulfonic acid]$_2$ ⟹ (1,3-dihydroxy benzene)$_2$. | Do. |
| 47 | 1,4-di-(4′-aminophenoxy)-butane ⟹ (2-amino-5-naphthol-7-sulfonic acid)$_2$ ⟹ (1,3-dihydroxy-benzene)$_2$ | Maroon. |
| 48 | 1,4-di-(4′-aminophenoxy)-butane ⟹ (1-amino-naphthalene-6-sulfonic acid)$_2$ ⟹ (1,3-dihydroxy-benzene)$_2$ | Brown. |
| 49 | 1,4-di-(4′-aminophenoxy)-butane ⟹ (1-(3′-aminophenyl)-5-pyrazolone-3-carboxylic acid)$_2$ ⟹ (1,3-dihydroxy-benzene)$_2$. | Orange. |
| 50 | 1,4-di-(4′-aminophenoxy)-butane ⟹ (2-(4′-amino-3′-sulfo-phenylamino)-5-naphthol-7-sulfonic acid)$_2$ ⟹ (1,3-dihydroxy-benzene)$_2$. | Rubine. |
| 51 | 1,5-di-(4′-aminophenoxy-pentane) ⟹ (2-(4′-amino-benzoyl-amino)-5-naphthol-7-sulfonic acid)$_2$ ⟹ (1,3-dihydroxy-benzene)$_2$. | Scarlet. |
| 52 | 1,5-di-(4′-aminophenoxy-pentane) ⟹ (2-amino-5-naphthol-7-sulfonic acid)$_2$ ⟹ (1,3-dihydroxy-benzene)$_2$ | Maroon. |
| 53 | 1,5-di-(4′-aminophenoxy-pentane) ⟹ (1-amino-naphthalene-6-sulfonic acid)$_2$ ⟹ (1,3-dihydroxy-benzene)$_2$ | Brown. |
| 54 | 1,5-di-(4′-aminophenoxy-pentane) ⟹ (1-(3′-aminophenyl)-5-pyrazolone-3-carboxylic acid)$_2$ ⟹ (1,3-dihydroxy-benzene)$_2$. | Orange. |
| 55 | 1,5-di-(4′-aminophenoxy-pentane) ⟹ (2-(4′-amino-3′-sulfo-phenylamino)-5-naphthol-7-sulfonic acid)$_2$ ⟹ (1,3-dihydroxy-benzene)$_2$. | Rubine. |
| 56 | 1,2-di-(4′-aminophenoxy)-propane ⟹ (1-(3′-aminophenyl)-5-pyrazolone-3-carboxylic acid)$_2$ ⟹ (1,3-dihydroxy-benzene)$_2$. | Orange. |
| 57 | 1,2-di-(4′-aminophenoxy)-propane ⟹ (2-(3′-aminobenzoyl-amino)-5-naphthol-7-sulfonic acid)$_2$ ⟹ (1,3-dihydroxy-benzene)$_2$. | Scarlet. |
| 58 | 1,4-di-(4′-aminophenoxy)-butane ⟹ (2-(3′-aminobenzoylamino)-5-naphthol-7-sulfonic acid)$_2$ ⟹ (1,3-dihydroxy-benzene)$_2$. | Do. |
| 59 | 1,5-di-(4′-aminophenoxy)-pentane ⟹ (2-(3′-aminobenzoylamino)-5-naphthol-7-sulfonic acid)$_2$ ⟹ (1,3-dihydroxy-benzene)$_2$. | Do. |
| 60 | 1,3-di-(4′-amino-2′-methoxy-phenoxy)-propane ⟹ (1-(3′-aminophenyl)-5-pyrazolone-3-carboxylic acid)$_2$ ⟹ (1,3-dihydroxy-benzene)$_2$. | Do. |
| 61 | 1,3-di-(4′-amino-2′-methoxy-phenoxy)-propane ⟹ (2-(3′-aminobenzoylamino)-5-naphthol-7-sulfonic acid)$_2$ ⟹ (1,3-dihydroxy-benzene)$_2$. | Red. |
| 62 | 1,3-di-(4′-amino-2′-methoxy-phenoxy)-propane ⟹ (2-amino-5-naphthol-7-sulfonic acid)$_2$ ⟹ (1,3-dihydroxy-benzene)$_2$. | Violet. |
| 63 | 1,3-di-(4′-amino-2′-methoxy-phenoxy)-propane ⟹ (1-amino-5-naphthol-7-sulfonic acid)$_2$ ⟹ (1,3-dihydroxy-benzene)$_2$. | Red brown. |
| 64 | 1,3-di-(4′-amino-2′-methoxy-phenoxy)-propane ⟹ (2(4′-amino-3′-sulfo-phenylamino)-5-naphthol-7-sulfonic acid)$_2$ ⟹ (1,3-dihydroxy-benzene)$_2$. | Violet. |
| 65 | 1,3-di-(4′-amino-2′-methoxy-phenoxy)-propane ⟹ (2-amino-5-naphthol-1-sulfonic acid)$_2$ ⟹ (1,3-dihydroxy-benzene)$_2$. | Red brown. |
| 66 | Di-(4′-amino-phenoxy)-methane ⟹ (2-(3′-aminobenzoylamino)-5-naphthol-7-sulfonic acid)$_2$ ⟹ (1,3-dihydroxy-benzene)$_2$. | Scarlet. |
| 67 | Di-(4′-aminophenoxy)-methane ⟹ (1-(3′-aminophenyl-5-pyrazolone-3-carboxylic acid)$_2$ ⟹ (1,3-dihydroxy-benzene)$_2$. | Orange. |
| 68 | Di-(4′-aminophenoxy)-methane ⟹ (2-amino-5-naphthol-7-sulfonic acid)$_2$ ⟹ (1,3-dihydroxy-benzene)$_2$ | Maroon. |
| 69 | 1,3-di-(4′-aminophenoxy)-butane ⟹ (2-(3′-amino-benzoylamino)-5-naphthol-7-sulfonic acid)$_2$ ⟹ (1,3-dihydroxy-benzene)$_2$. | Scarlet. |

The following are of a few of the many X compounds which can be used instead of the X compounds recited in the foregoing examples: Di(4'-amino-phenoxy)methane, 1,2-di(4'-amino-2'-chloro-phenoxy)ethane, 1,2-di(4'-amino-2'-sulfo-phenoxy)ethane, 1,2-di(4'-amino-phenyl-thio)ethane, 1,3-di(4'-amino-2'-methoxy-phenoxy)propane, 1,5-di(4'-amino-phenoxy)pentane, 1,3-di(4'-amino-phenoxy)-propanol-2, b,b'-di(4'-amino-phenoxy)ethyl ether and 1,3-di(2'-amino phenoxy)propane.

As further illustrations of Y components are mentioned: (1-(4'-aminophenyl)-3-methyl-5-pyrazolone, amino benzene, 3-methyl-amino benzene, 2-methoxy-5-methyl-amino benzene, 1-naphthylamine-6-sulfonic acid, 1-naphthylamine-7-sulfonic acid, 2-amino-5-naphthol-7-sulfonic acid, 2(3'-amino-benzoylamino)-5-naphthol-7-sulfonic acid, 2-[4'-(4''-amino-benzoylamino)-benzoylamino]-5-naphthol-7-sulfonic acid and 2(4'-amino-3'-sulfo-phenylamino)-5-naphthol-7-sulfonic acid.

The preferred embodiments of the invention are those in which resorcinol is used as the end component. Of these the embodiments in which the amino-phenyl pyrazolones, the amino naphthol sulfonic acids and the aminobenzoylamino-naphthol sulfonic acids are used as the Y component are preferred, and among these Y components the aminobenzoylamino-naphthol sulfonic acids are preferred.

Deeper shades than the direct or formaldehyde treated dyeings and with better light fastness are produced by after-treatment of these colors with water-soluble metal salts, such as water-soluble salts of copper, for example copper sulfate. For example, the after-coppering operation may be carried out by either of the procedures outlined in Example 1 for the after-treatment with formaldehyde by using a solution containing a 5% solution of hydrated cupric sulfate equal in amount to the formaldehyde used in the preceding step. In both cases the operation is allowed to continue for twenty minutes, or for such time as is necessary to metallize the dyeing, at the end of which time the treated dyeings are removed, rinsed and dried. The after-coppering may replace the formaldehyde treatment, but both after-treatments are preferred where the best light fastness as well as washing fastness is desired. After-treatment with both formaldehyde and metal salts may be done either in the dye bath or in a fresh bath. When a fresh formaldehyde bath is used and the dyeing is treated for a sufficient time to form the formaldehyde compound, the metal salt may be added and the treatment continued for an interval of time. The dyeings are then removed, rinsed and dried. Similar results are obtained by reversing the order of adding the after-treating reagents, that is, by adding the metal salt solution first, treating for the necessary time, and then adding the formaldehyde solution. After treating the dyeings for about twenty minutes, they are removed, rinsed and dried.

The described method of dyeing is typical but it is to be understood that the invention is not restricted to the precise concentrations, temperatures and intervals of treatment specified in the examples since these details can be variously modified as will be understood by those skilled in the art. For example, the after-treatments with formaldehyde or metal salts may be carried on for longer or shorter periods and at higher or lower temperatures than those specified in the illustrations. Any treatment which will form a formaldehyde complex with the dyeing or one of the described metal complexes with the dyeing, as the case may be, produces the improved results with the dyes described. The exact composition of the described formaldehyde and metal complexes is unknown to us, but from our investigations it is our present belief that formaldehyde and metal complexes are formed.

In the specification and claims alkyl refers to straight and branched aliphatic groups and alkoxy refers to the corresponding alkoxy groups. The sulfonic acid and carboxyl groups in the dyes may be the salts of any of the alkali metals and may be produced by making the coupling media basic with the corresponding alkalis. The acid forms may also be made by treating the alkali metal salt forms with acids by methods well known in the art.

Water-soluble metal salts of various metals can be used for metallizing the dyeings, those having atomic weights between 50 and 65 being the most suitable. As examples of such metals copper, chromium, nickel, cobalt and iron are mentioned. Either water-soluble salts or inorganic or organic acids can be used such as sulfates, halides, formates and acetates, for example copper sulfate, nickel sulfate, chromium chloride, copper formate, copper acetate and many other water-soluble metal salts of inorganic and organic acids.

The compounds of the invention in the form of their alkali metal salts give dyeings on cellulosic fibers which are equal to and superior in washing fastness to direct colors and they are in general more convenient and less costly to apply than developed colors.

From the foregoing disclosure it will be recognized that the invention is susceptible of modification without departing from the spirit and scope thereof and it is to be understood that the invention is not restricted to the specific illustrations thereof herein set forth.

We claim:

1. The azo compound represented by the formula $$A \leftarrow Y \leftarrow X \rightarrow Y \rightarrow A$$

in which X is one of a group represented by the formulae

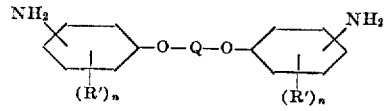

and

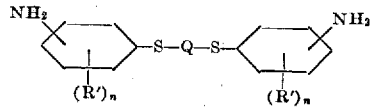

wherein Q is a radical of the group consisting of straight and branched chain alkylene radicals having 1 to 10 carbons, mono-hydroxy-alkylene radicals having 3 to 7 carbons wherein the hydroxy group is attached to a carbon other than that directly attached to —O— or —S— and alkylene ether radicals having 1 to 4 carbons in each alkylene group; R' is at least one of the group consisting of hydrogen, alkyl having 1 to 6 carbons, the corresponding alkoxy groups, halogen, carboxy and sulfonic acid and $n$ is 1 to 4; each Y is one of a group consisting of radicals of amino-phenyl pyrazolones, amino benzenes, naphthylamines and 1- and 2-amino-naphthol sulfonic acids represented by the formulae

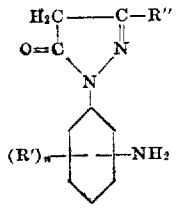

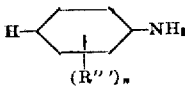

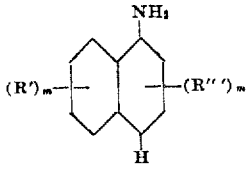

and

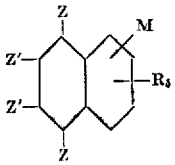

in which R'' is from the group consisting of methyl and carboxyl; R''' is from the group consisting of hydrogen, alkyl and alkoxy; $n$ is 1 to 4; $m$ is 1 to 2; $R^5$ is one of a group consisting of hydrogen, alkyl, alkoxy and sulfonic acid; one Z is hydroxy and the other is hydrogen; the Z' which is meta to hydroxy is sulfonic acid and the other is hydrogen; M is in the 1- or 2-position of the naphthalene nucleus and is one of a group consisting of

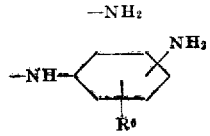

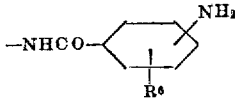

and

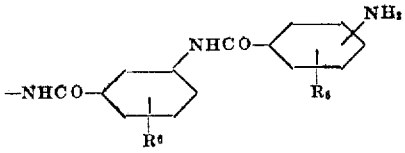

wherein $R^6$ is one of a group consisting of hydrogen, alkyl, alkoxy, halogen and sulfonic acid, and amino is in the meta or para position to —CO—; and each A is a radical of a metadihydroxy benzene represented by the formula

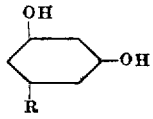

wherein R is one of a group consisting of hydrogen, alkyl having 1 to 6 carbons, the corresponding alkoxy groups, amino, halogen, CN, carboxyl and sulfonic acid.

2. The compounds in accordance with claim 1 in which A is resorcinol.

3. The compounds in accordance with claim 1 in which Y is amino-benzoylamino-naphthol sulfonic acid and A is resorcinol.

4. The azo compound represented by the formula

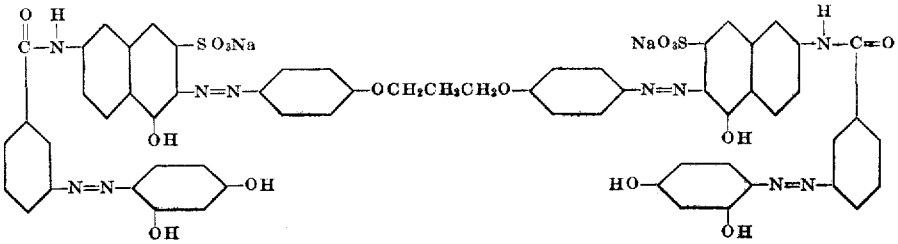

5. The azo compound represented by the formula

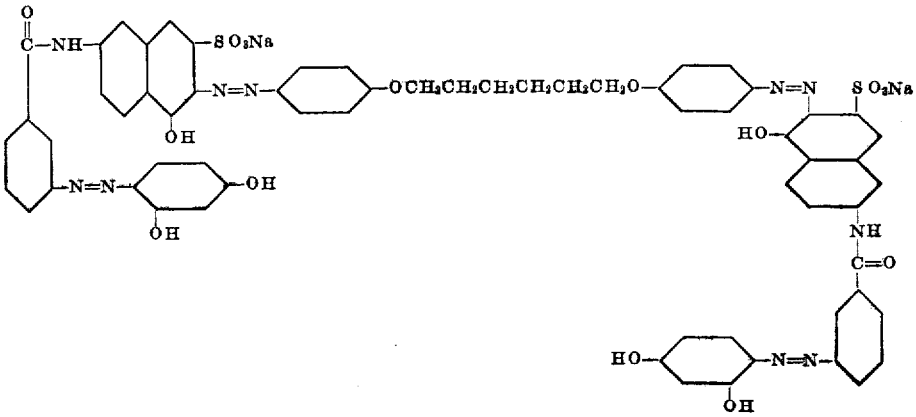

6. The azo compound represented by the formula

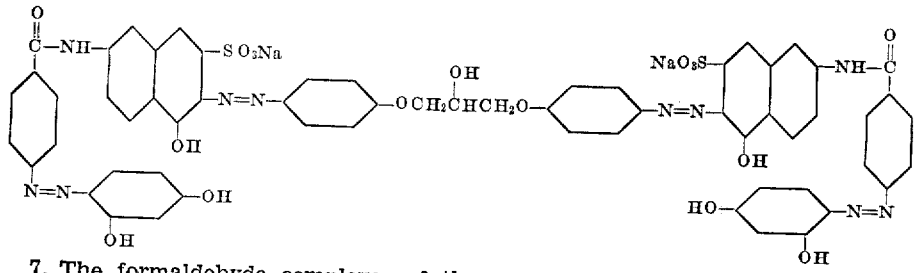

7. The formaldehyde complexes of the compounds of claim 1.

8. The formaldehyde complexes of the compounds of claim 2.

9. The formaldehyde complexes of the compounds of claim 3.

10. The formaldehyde complexes of the compounds of claim 4.

11. The formaldehyde complexes of the compounds of claim 5.

12. The formaldehyde complexes of the compounds of claim 6.

13. The formaldehyde and metal complexes of the compounds of claim 1.

14. The formaldehyde and metal complexes of the compounds of claim 2.

15. The formaldehyde and metal complexes of the compounds of claim 3.

16. In the manufacture of a compound represented by the formula

A←Y←X→Y→A in which X is one of a group represented by the formulae

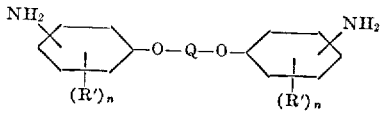

and

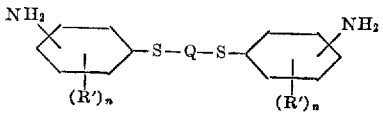

wherein Q is a radical of the group consisting of straight and branched chain alkylene radicals having 1 to 10 carbons, mono-hydroxy-alkylene radicals having 3 to 7 carbons wherein the hydroxy group is attached to a carbon other than that directly attached to —O— or —S— and alkylene ether radicals having 1 to 4 carbons in each alkylene group; R′ is at least one of the group consisting of hydrogen, alkyl having 1 to 6 carbons, the corresponding alkoxy groups, halogen, carboxy and sulfonic acid and $n$ is 1 to 4; each Y is one of a group consisting of the radicals of amino-phenyl pyrazolones, amino benzenes, naphthylamines and 1- and 2-aminonaphthol sulfonic acids represented by the formulae

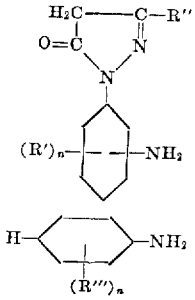

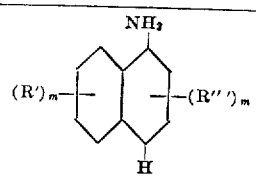

and

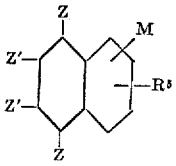

in which R″ is from the group consisting of methyl and carboxyl; R‴ is from the group consisting of hydrogen, alkyl, and alkoxy; $n$ is 1 to 4; $m$ is 1 to 2; $R^5$ is one of a group consisting of hydrogen, alkyl, alkoxy and sulfonic acid; one Z is hydroxy and the other is hydrogen; the Z′ which is meta to hydroxy is sulfonic acid and the other is hydrogen; M is in the 1- or 2-position of the naphthalene nucleus and is one of a group consisting of

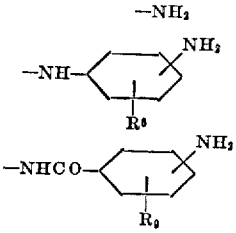

and

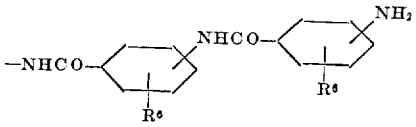

wherein $R^6$ is one of a group consisting of hydrogen, alkyl, alkoxy, halogen and sulfonic acid, and amino is in the meta or para position to —CO—; and each A is a radical of a meta-dihydroxy benzene represented by the formula

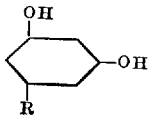

wherein R is one of a group consisting of hydrogen, alkyl having 1 to 6 carbons, the corresponding alkoxy groups amino, halogen, CN, carboxyl and sulfonic acid; the steps which comprise tetrazotizing a compound represented by X and coupling in alkaline medium with two molecular equivalents of a compound represented by Y, tetrazotizing the disazo product of said coupling and again coupling in alkaline medium with two molecular equivalents of a compound represented by A.

17. The process which comprises dyeing a dyeable fabric with a compound represented by the formula $$A \leftarrow Y \leftarrow X \rightarrow Y \rightarrow A$$

in which X is one of a group represented by the formula

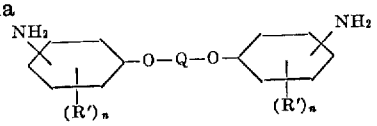

and

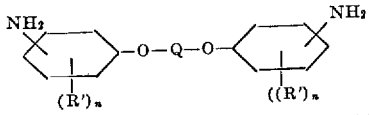

wherein Q is a radical of the group consisting of straight and branched chain alkylene radicals having 1 to 10 carbons, mono-hydroxy-alkylene radicals having 3 to 7 carbons wherein the hydroxy group is attached to a carbon other than that directly attached to —O— or —S— and alkylene ether radicals having 1 to 4 carbons in each alkylene group; R′ is at least one of the group consisting of hydrogen, alkyl having 1 to 6 carbons, the corresponding alkoxy groups, halogen, carboxy and sulfonic acid and $n$ is 1 to 4; each Y is one of a group consisting of the radicals of amino-phenyl pyrazolones, amino benzenes, naphthylamines and 1- and 2-aminonaphthol sulfonic acids represented by the formulae

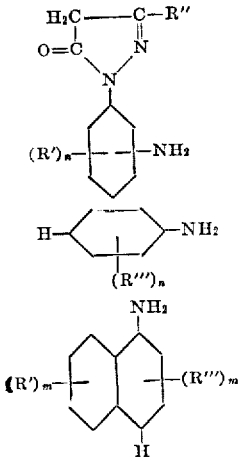

and

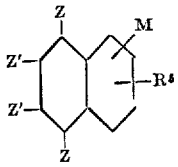

in which R″ is from the group consisting of methyl and carboxyl; R‴ is from the group consisting of hydrogen, alkyl and alkoxy; $n$ is 1 to 4; $m$ is 1 to 2; $R^5$ is one of a group consisting of hydrogen, alkyl, alkoxy and sulfonic acid; one Z is hydroxy and the other is hydrogen; the Z′ which is meta to hydroxy is sulfonic acid and the other is hydrogen; M is in the 1- or 2-position of the naphthalene nucleus and is one of a group consisting of

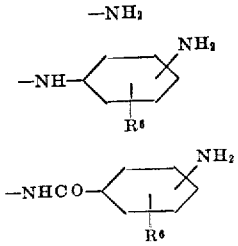

and

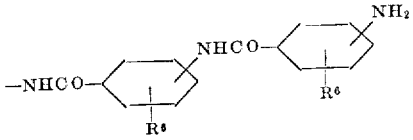

wherein $R^6$ is one of a group consisting of hydrogen, alkyl, alkoxy, halogen and sulfonic acid, and amino is in the meta or para position to —CO—; and each A is a radical of a meta-dihydroxy benzene represented by the formula

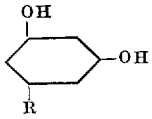

wherein R is one of a group consisting of hydrogen, alkyl having 1 to 6 carbons, the corresponding alkoxy groups, amino, halogen, CN, carboxyl and sulfonic acid; and then applying an aqueous solution of formaldehyde until a formaldehyde complex is formed.

SWANIE S. ROSSANDER.
DONOVAN E. KVALNES.
CHILES E. SPARKS.

CERTIFICATE OF CORRECTION.

Reissue No. 22,286. March 9, 1943.

SWANIE S. ROSSANDER, ET AL.

It is hereby certified that error appears in the printed specification of the above numbered patent requiring correction as follows: Page 9, second column, line 48, in the formula, for "$R_9$" read --$R_6$--; page 10, first column, line 18, in the formula, for "-O-Q-O-" read -- -S-Q-S- --; and that the said Letters Patent should be read with this correction therein that the same may conform to the record of the case in the Patent Office.

Signed and sealed this 18th day of May, A. D. 1943.

Henry Van Arsdale,
Acting Commissioner of Patents.

(Seal)